Figures 1, 2, 3:
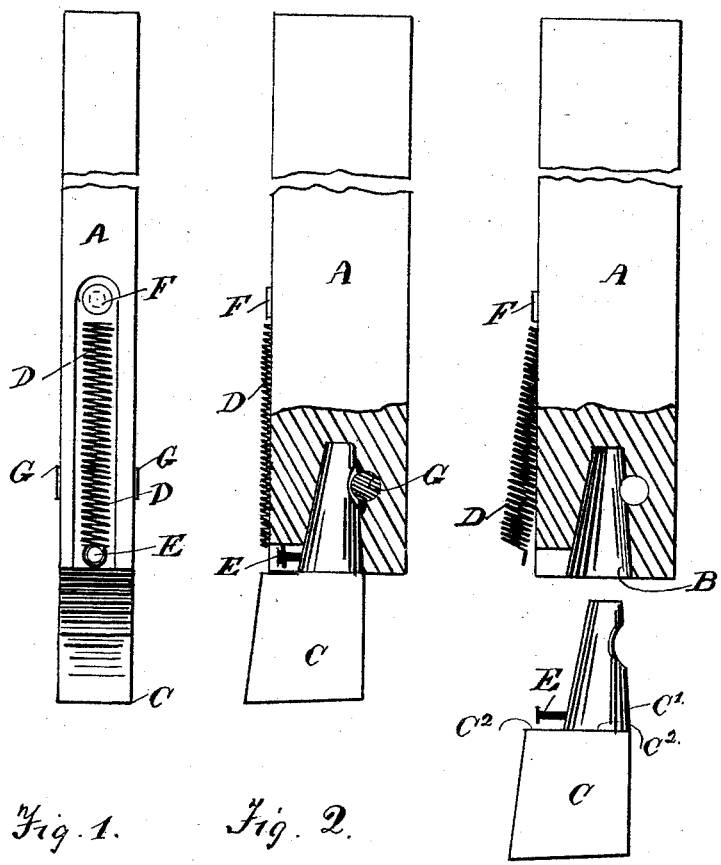

(No Model.)

J. & T. CARTER.
TOOL AND TOOL HOLDER FOR SLOTTING MACHINES.

No. 458,616. Patented Sept. 1, 1891.

Witnesses
J. H. Butterworth
Charles C. Walton

Inventors
Joseph Carter
Thomas Carter

UNITED STATES PATENT OFFICE.

JOSEPH CARTER AND THOMAS CARTER, OF ROCHDALE, ENGLAND.

TOOL AND TOOL-HOLDER FOR SLOTTING-MACHINES.

SPECIFICATION forming part of Letters Patent No. 458,616, dated September 1, 1891.

Application filed May 25, 1891. Serial No. 393,923. (No model.) Patented in England December 3, 1890, No. 19,689.

*To all whom it may concern:*

Be it known that we, JOSEPH CARTER and THOMAS CARTER, engineers, subjects of the Queen of Great Britain, residing at Rochdale, in the county of Lancaster, England, have invented Improvements in Tools and Tool-Holders Applicable to Slotting-Machines, of which the following is a specification.

This invention has been patented in England, No. 19,689, dated December 3, 1890.

This invention relates to tools for cutting metal and used in connection with slotting-machines, but more particularly to such class of tools adapted to yield or deflect when pressure is applied to or a rubbing action occurs between the cutting-edge and the work.

In order that a clear understanding of our invention may be had, we have hereunto annexed a sheet of drawings, showing three figures illustrating the details of the said invention:

Figure 1 represents a front elevation. Fig. 2 represents a side elevation. Fig. 3 represents a side elevation in section, showing the tool detached from the holder.

According to our construction the tool-holder consists of a bar of metal A, which we term the "holder." The holder is provided at its lower extremity with an aperture or hole B, bored out cone or taper shape and in a lengthwise direction of the holder. We form on the tool C a shank C', of a shape corresponding to the form of the aperture, which shank is turned or shaped by means of a lathe.
We insert the shank loosely within the aperture. The said tool is retained in position, the shank being seated in the aperture, and the part C² or portion about the base of the shank is caused to abut against the holder by means of a spiral coil or spring D, connected at its one end to a projection or pin E, provided on the tool, its other end attached to a fixed stud F, provided on the holder. The upper part of the shank is recessed, as shown in Fig. 3. The aperture B is also recessed, and a pin G engages these two recesses and allows the tool to descend when the cutting-edge of the tool is in contact or engages with the work during the period of withdrawal of the tool therefrom, but at the same time to prevent a deviation from its true or cutting positions when the shank of the tool is withdrawn from its seat. Thus by the aid of the pin the tool may be maintained true or square to its work.

When in use, the bar or holder is secured to the tool-box of the slotting-machine by the ordinary means, which are well known.

What we claim as our invention, and desire to secure by Letters Patent, is the following:

1. The combination of a cutter having a conical shank with a holder having a conical recess to receive said shank, the two being separable, and a spring holding the said shank normally in said recess, substantially as set forth.

2. The combination of a cutter having a conical slotted shank with a holder having a conical-slotted recess to receive said shank, said cutter and holder being separable, a pin engaging the slot in both said shank and said recess, and a spring holding the cutter normally in engagement with said holder, substantially as set forth.

JOSEPH CARTER.
THOMAS CARTER.

Witnesses:
FRED A. VETTER,
J. H. BUTTERWORTH.